May 14, 1935.  J. H. JOHNSON  2,001,577
RECIPROCATING ENGINE
Filed July 23, 1932   5 Sheets-Sheet 2

Inventor
John H. Johnson
By his Attorneys
Williamson & Williamson

Inventor
John H. Johnson
By his Attorneys
Williamson & Williamson

May 14, 1935.  J. H. JOHNSON  2,001,577
RECIPROCATING ENGINE
Filed July 23, 1932   5 Sheets-Sheet 4
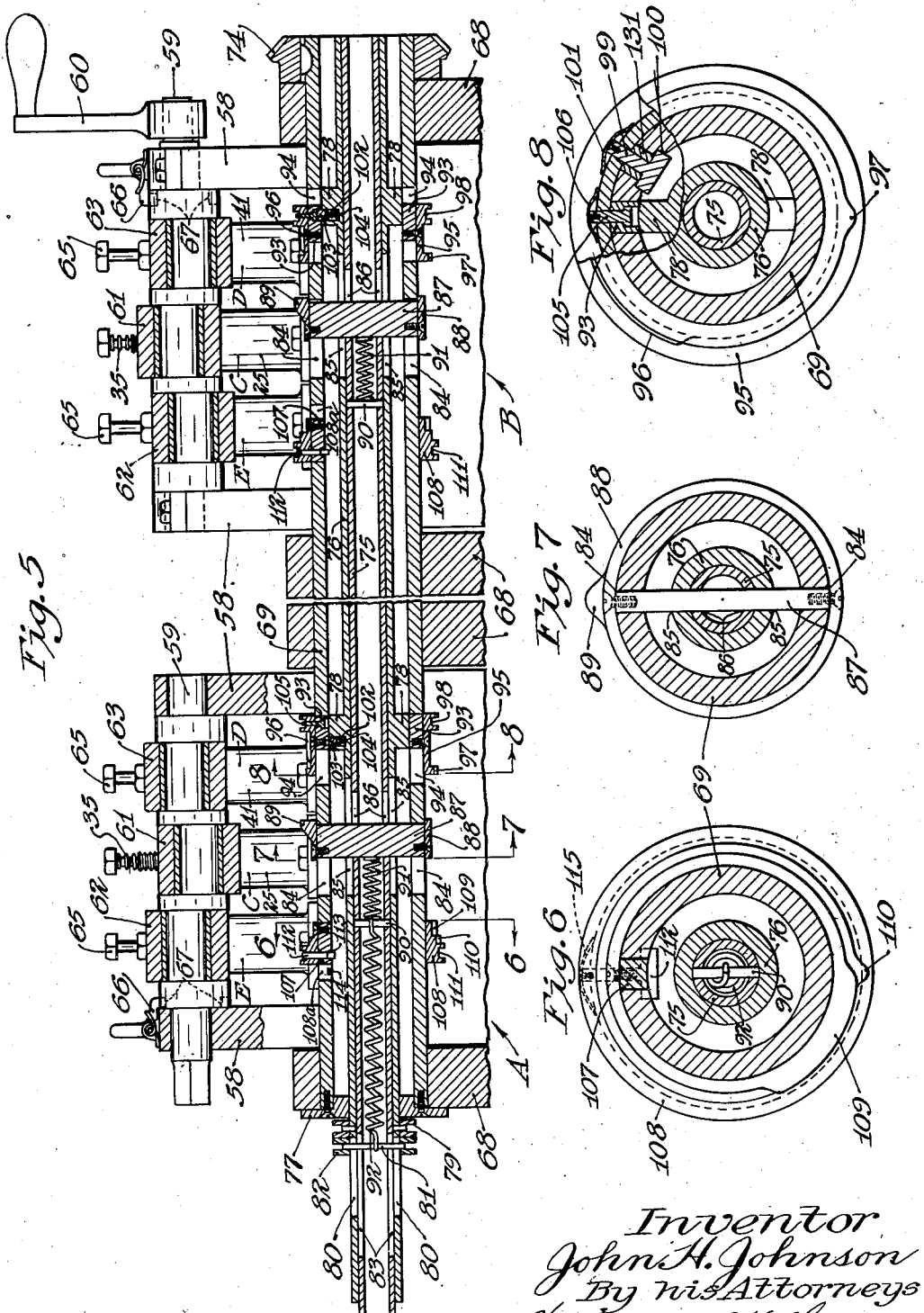
Inventor
John H. Johnson
By his Attorneys
Williamson & Williamson May 14, 1935.  J. H. JOHNSON  2,001,577
RECIPROCATING ENGINE
Filed July 23, 1932   5 Sheets-Sheet 5
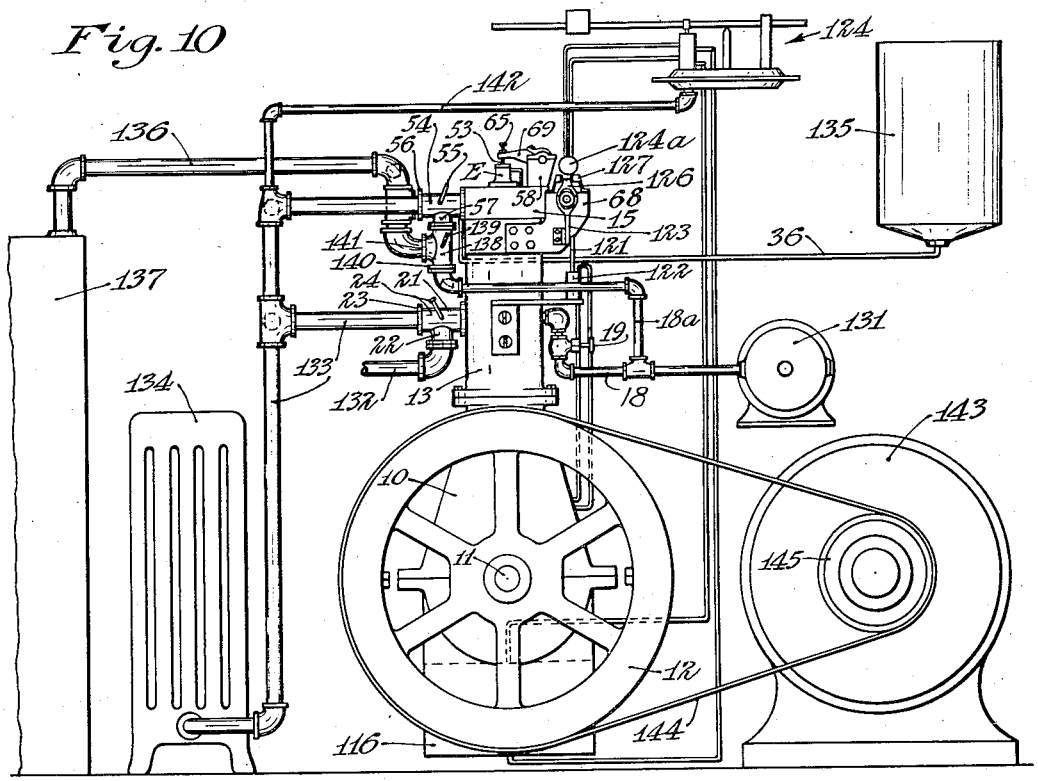
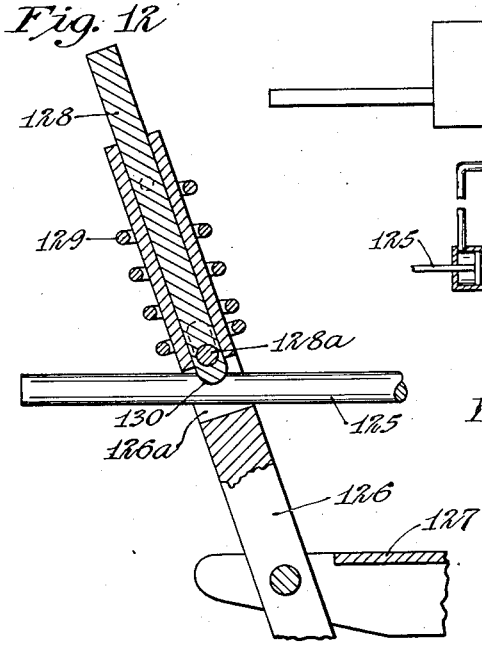
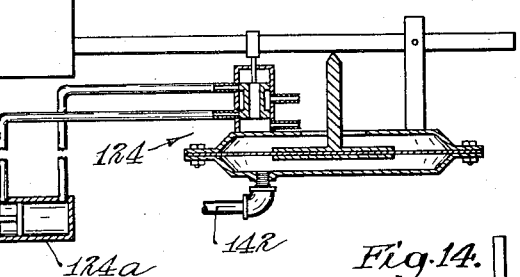
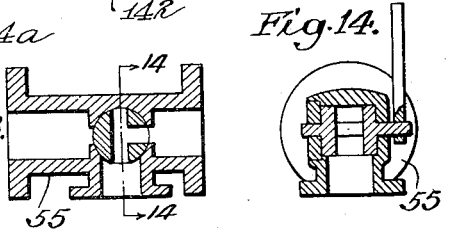
Inventor
John H. Johnson
By his Attorneys
Williamson & Williamson Patented May 14, 1935

2,001,577

UNITED STATES PATENT OFFICE 2,001,577

RECIPROCATING ENGINE

John H. Johnson, Buffalo, Minn.

Application July 23, 1932, Serial No. 624,232

7 Claims. (Cl. 60—16)

This invention relates to reciprocating engines, and particularly it relates to convertible steam internal combustion engines.

At the present development of the steam engine and the internal combustion engine of the Diesel type, it is a well recognized fact that in generating power the steam engine is more efficient in operation than the internal combustion engine if the exhaust steam from the steam engine can be utilized as process steam or for heating purposes. It is also a well recognized fact that the internal combustion engine and particularly the Diesel engine is more efficient in generating power than the steam engine when the exhaust steam from the steam engine cannot be utilized as process steam or for heating purposes.

In many situations where power is required, steam for process use or for heating is at times also required, while at other times no steam for process use or for heating is required. Also at certain times more steam for process use or for heating may be needed than at other times and there also may be fluctuating requirements as to the power needed.

It is the general object of this invention to provide, for use with power driven machinery and steam utilizing devices, a convertible engine, which can be placed under internal combustion power operation, or under steam operation, or under both, to drive the power driven machinery and supply exhaust steam for the steam utilizing devices most efficiently.

It is a further object to provide a multi-cylinder engine for this purpose, any or all of which cylinders can be operated as steam cylinders of a steam engine and any or all of which cylinders can be operated as cylinders of an internal combustion engine, such as a two cycle Diesel type engine.

Yet another object is to provide, with such an engine, proper control mechanisms making the engine responsive to the requirements of the power driven mechanism and at the same time responsive to the requirements of the steam utilizing devices.

Another object of the invention is to increase the efficiency of a Diesel type internal combustion engine by introducing steam into the combustion space, thereby furnishing greater quantities of oxygen for combination with the carbon of the injected fuel than when air only is introduced, and increasing the power of the engine.

The objects and advantages of the invention will more fully appear from the following description, made in connection with the accompanying drawings, wherein like reference characters refer to the same or similar parts throughout the various views and, in which, Fig. 1 is a view taken chiefly in side elevation of a multi-cylinder engine embodying the present invention, certain of the parts being broken away and other parts being shown in vertical section, some of the parts used with one cylinder being omitted;

Fig. 5 is an irregular vertical section taken substantially on the line 5—5 of Fig. 4, as indicated by the arrows;

Fig. 6 is a vertical section taken on the line 6—6 of Fig. 5, as indicated by the arrows;

Fig. 7 is a vertical section taken on the line 7—7 of Fig. 5, as indicated by the arrows;

Fig. 8 is a vertical section taken on the line 8—8 of Fig. 5, as indicated by the arrows, certain of the parts being broken away to clearly show other parts;

Fig. 10 is an illustrative view in end elevation of an engine embodying the invention connected for use in driving a generator and for supplying exhaust steam to a heating system;

Fig. 11 is a view taken chiefly in vertical section and illustrating a type of hydraulic pressure regulator that may be used with the engine, the jack of the regulator being set at 90° from its true position, as viewed in Fig. 10;

Fig. 12 is a detailed view illustrating chiefly in vertical section, part of the mechanism operated by the hydraulic pressure regulator;

Fig. 13 is a vertical longitudinal section taken through one of the valves that is used; and Fig. 14 is a section taken on the line 14—14 of Fig. 13, as indicated by the arrows.

Figure 1:
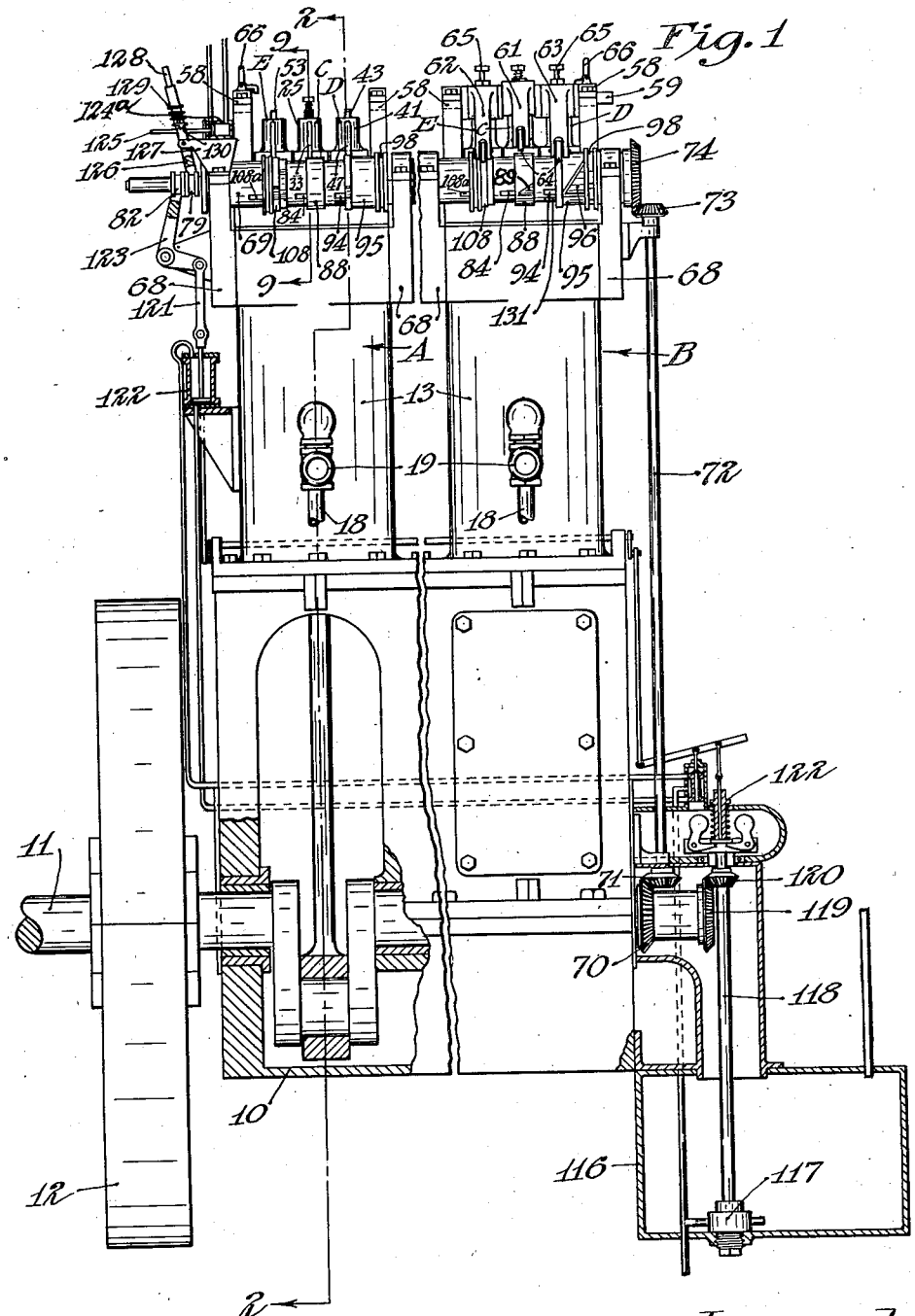

The type of engine chosen for illustration of the invention is a multi-cylinder engine, only two cylinders of which are shown in detail and which cylinders are each capable of operation either in the manner of a steam engine or a two-cycle Diesel engine. It will be clearly understood that my engine may have any number of cylinders and that it is entirely possible to so construct the engine that each cylinder may operate in the manner of either a two or four cycle internal combustion engine of any type, as well as to also operate as a steam engine.

Referring to the drawings, the engine as shown includes a crank case 10 within which a suitably formed crank shaft 11 is journaled, the said crank shaft adjacent one end carrying a flywheel 12. Cylinders 13 rise from the crank case 10 and each cylinder has a ring equipped piston 14 mounted for reciprocation therein below a head 15. The expansion space between the head 15 and the upper end of the piston 14 is designated by the numeral 16. The cylinder 13 at the left of Fig. 1 may be designated as an entirety by the letter A in contra-distinction to the cylinder at the right of Fig. 1 which may be designated as an entirety by the letter B.

Mounted in the head 15 of each cylinder, the head being formed to accommodate the same, are a fuel intake valve assembly C for Diesel operation, a steam intake valve assembly D for steam operation and a steam exhaust valve assembly E also for steam operation. In the side of each cylinder 13 is a port 17 which communicates with the expansion space 16 immediately above the head of the piston 14 when the piston is in its lowermost position. This port will be closed by the piston at all other times. This port 17 serves as an intake for scavenging air under pressure which may be supplied to the port through a conduit 18 equipped with a valve 19. Air may be furnished to the conduit 18 by a pump 131 as shown in Fig. 10. Opposite the scavenging air port 17 there is provided an exhaust port 20 which communicates with the expansion space 16 only when the piston 14 is in its extreme lowermost position and is closed by the piston at all other times. A conduit 21 having two outlets 22 and 23 communicates with this port 20 and this conduit is equipped with a three-way valve 24 to permit deflection of exhaust gases under Diesel operation to the outlet 22 and to permit deflection of exhaust steam under steam operation to the outlet 23. In practice, the various outlets 22 of the different cylinders will be connected to an exhaust pipe 132. Also in practice the various outlets 23 of the different cylinders will be connected to a common exhaust steam pipe 133 from which steam may be drawn for process work or for heating purposes or from which steam may be withdrawn for exhaustion into the air. In Fig. 10 the exhaust steam pipe 133 is shown as connected to a steam utilizing device, radiator 134, where the steam is utilized for heating purposes.

Figure 9:
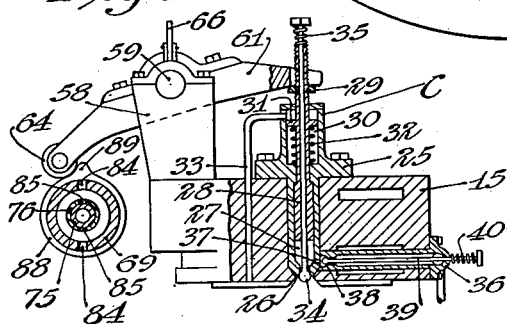
Fig. 9 is a view taken chiefly in vertical section substantially on the line 9—9 of Fig. 1, as indicated by the arrows.
Figure 3:
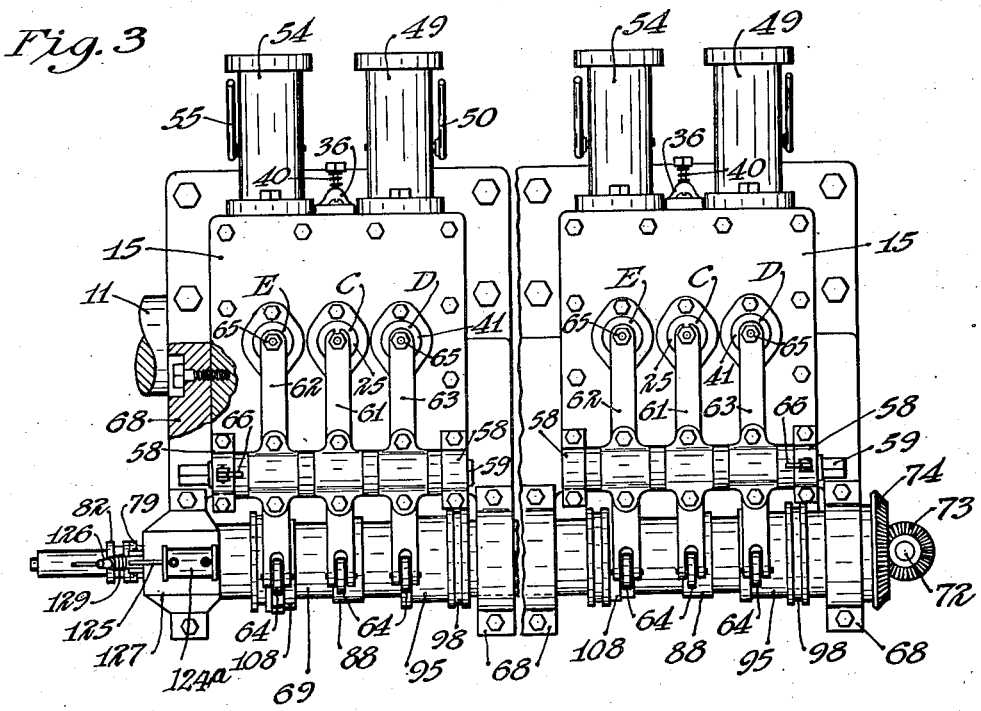
Fig. 3 is a plan view of the engine, some of the parts being broken away and shown in section.

The fuel intake valve assembly C for Diesel operation is best shown in Fig. 9. This assembly includes a valve cage 25 mounted at the central portion of the head 15 and projecting downwardly through a passage in the head to communicate at its lower end with the expansion space 16 of the particular cylinder to which the assembly C is applied. At its lower end, the cage 25 forms a valve seat 26. The cage 25 above valve seat 26 is shaped to form a pump chamber 27 within which a pump plunger 28 is mounted for reciprocation. The plunger 28 has a reduced shank which projects upwardly above the plunger proper and is screw threaded adjacent its upper end to receive a nut 29. Above the chamber 27 a second chamber 30 is formed in the cage 25 and the shank of plunger 28 carries a flange 31 which fits within this chamber 30. A coiled pressure spring 32 reacts between the flange 31 and the bottom of chamber 30 and this spring surrounds the shank of plunger 28. A tube 33 running through the head 15 affords communication between the upper end of the expansion chamber 16 and the upper end of chamber 30 above flange 31. The plunger 28 is provided with a longitudinal bore throughout its length within which the stem of a valve 34 extends, the said valve being adapted to seat against seat 26. The stem of the valve 34 projects above the shank of plunger 28 and is equipped at its upper end with a head between which and the upper end of the shank of plunger 28 a coiled pressure spring 35 reacts. A liquid fuel supply conduit 36, running from any suitable source of supply such as tank 135, runs into the head 15 from the right side thereof as viewed in Fig. 9 through a passage provided in the head and communicates with the chamber 27 through an opening 37 adjacent the lower end of the cage 25. A valve seat 38 is formed in the conduit 36 adjacent its inner end and a check valve 39 cooperates with this seat and has a stem which runs outwardly through a portion of conduit 36 to terminate in a head, there being a coiled pressure spring 40 surrounding the stem of the check valve 39 and reacting between the head of the stem and a portion of the conduit 36.

Figure 2:
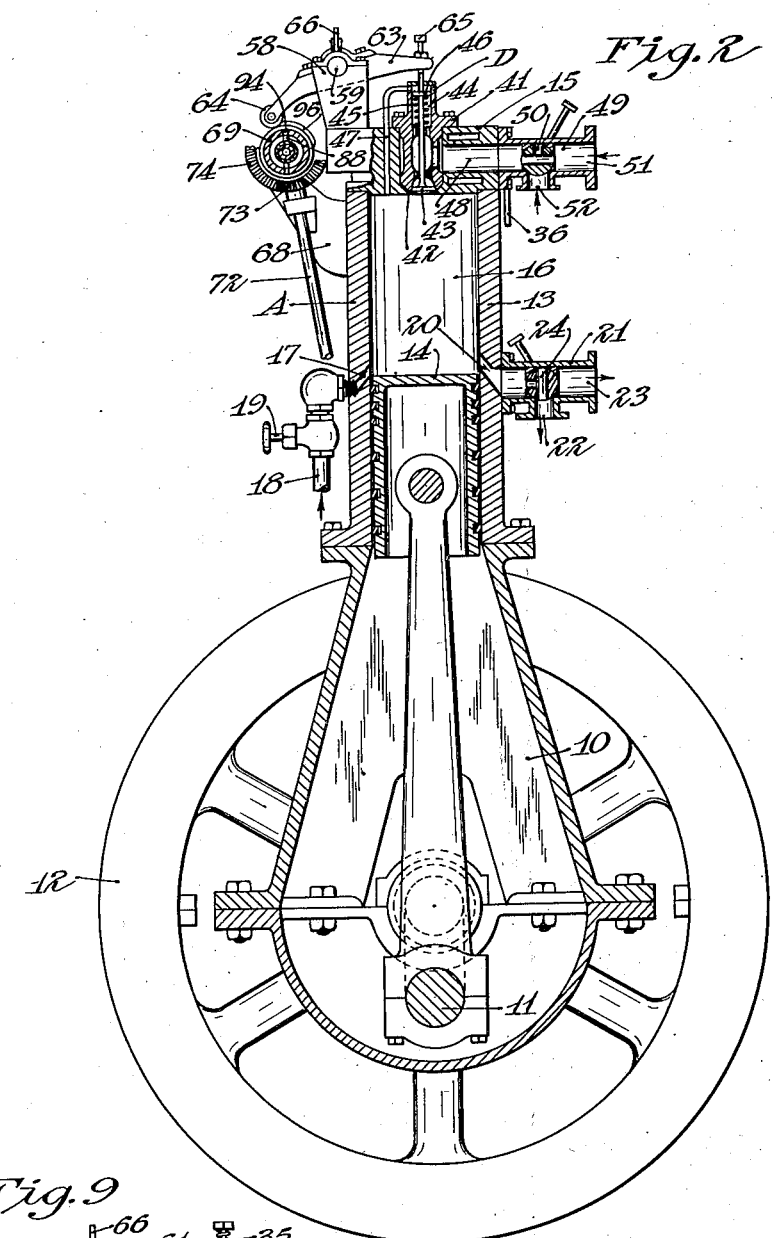
Fig. 2 is a vertical section taken on the line 2—2 of Fig. 1, as indicated by the arrows.
Figure 4:
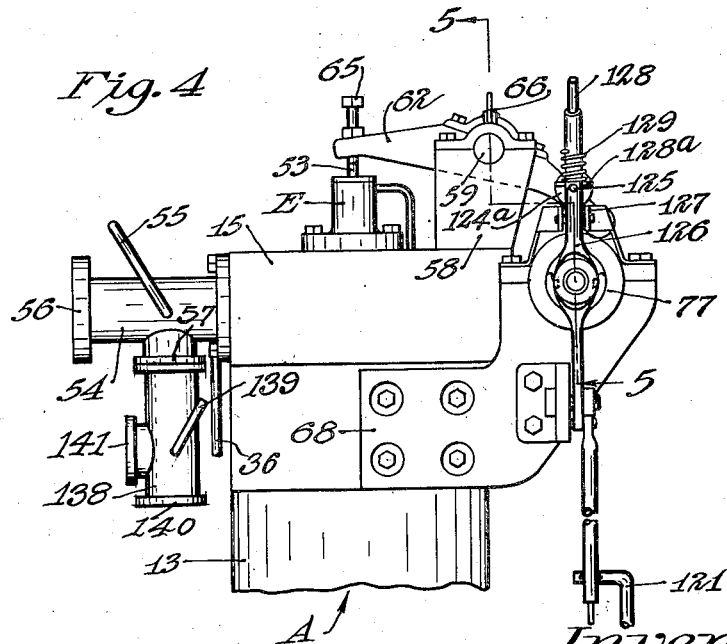
Fig. 4 is a view in end elevation of the upper portion of the engine looking toward the fly wheel end of the same.

The steam intake valve assembly D is best illustrated in detail in Fig. 2, and this assembly is located to the right of the valve assembly C as viewed in Fig. 1. A valve cage 41 is mounted in a vertical passage through the head 15 and this valve cage terminates in a valve seat 42, the passage through which communicates with the expansion chamber 16. A valve 43 guided by the valve cage 41 cooperates with the seat 42 and the stem of this valve projects upwardly above the cage 41. A chamber 44 is provided in the upper portion of the cage 41 and within this chamber there is located a coiled pressure spring 45 which surrounds the stem of the valve 43 and reacts between the bottom of the chamber and a flange 46 secured to the stem of the valve. A tube 47 projecting through the head 15 affords communication between the upper end of the expansion space 16 and the chamber 44 above the flange 46. The lower portion of the valve cage 41 is slotted to afford communication with a horizontal passage 48 projecting through the head 15 from adjacent the valve cage 41 to the right side of the head as viewed in Fig. 2. A conduit 49 equipped with a three-way valve 50 and having two inlet mouths 51 and 52 respectively, is connected to the head 15 to afford communication with the passage 48. In practice, the mouths 51 of the conduits 49 of the various cylinders will be connected to a common steam supply pipe 136 to which steam under pressure may be supplied as from a steam boiler 137. In practice the mouths 52 of the various conduits 49 for the different cylinders will be connected to a common air supply conduit 18a to which air under pressure may be supplied from the pump 131 and conduit 18. The steam exhaust valve assembly E is constructed identically the same as is the steam intake valve assembly D and therefore no detailed description of the same is necessary. Suffice it to say that the steam exhaust valve is designated by the numeral 53 and that the conduit leading to the passage through the head 15 communicating with the valve cage for the exhaust valve 53 is designated by the numeral 54, as best illustrated in Fig. 4 and Fig. 10. This conduit 54, like the conduit 49, is equipped with a three-way valve 55, illustrated in detail in Figs. 13 and 14, and it has a steam exhaust outlet 56 and an inlet mouth 57 for air or steam. In practice, the various exhaust outlets 56 will be connected to the exhaust steam pipe 133. Connected to the inlet mouth 57 is a three-way fitting 138 equipped with a valve 139 and having an air intake mouth 140 and a steam intake mouth 141. The air intake mouths 140 of the various cylinders will, in practice, be connected to air supply conduit 18a, while the steam intake mouths 141 of the various cylinders will be connected to steam supply pipe 136.

Mounted on each cylinder head 15 to the left of the various valve assemblies, as illustrated in Fig. 2, are a pair of bearing brackets 58, within each pair of which there is mounted for oscillation a short crank shaft 59 squared at one end to receive a crank 60. The shaft 59 is provided with three crank portions, the two outer ones of which are similarly located and the medial one of which is offset from the axial line of the shaft 59 in a direction, preferably although not necessarily, generally opposite from the offset of the outer crank portions of the shaft. A rocker arm 61 is mounted for oscillation on the central crank portion of the shaft 59, while rocker arms 62 and 63 respectively are mounted for oscillation on the outer crank portions of the shaft. Each rocker arm 61, 62, and 63 has a left end, as viewed in Fig. 2, forked to receive a pin upon which a cam roller 64 is mounted. The right ends of the two rocker arms 62 and 63 project over the stems of the respective valves 53 and 43 and each of said ends of the said rocker arms carries a lock nut equipped screw 65 which will bear against the valve stem immediately below the same. The right or inner end of the rocker arm 61, as viewed in Figs. 2 and 9, is forked to receive the shank of the plunger 28 and this end of the said rocker arm bears against the nut 29 (Fig. 9). It will be seen that by rotation of crank shaft 59, the rocker arms 61, 62 and 63 may be raised or lowered and that, due to the crank formation of the crank shaft, as the rocker arm 61 is lowered the two rocker arms 62 and 63 will be raised and vice versa. To lock each crank shaft 59 from rotation in two different positions, in one of which the rocker arm 61 will be lowered to its extreme position and the rocker arms 62 and 63 will be raised to their extreme position, and in the other of which the rocker arm 61 will be raised to its highest position and the rocker arms 62 and 63 will be lowered to their lowest position, there is pivotally mounted on one of the bearing brackets 58 a spring pressed dog 66 which may be engaged with the shaft 59 within either one of two oppositely disposed dog receiving recesses 67 formed within the shaft adjacent one end of the same. In Fig. 5 one of the two crank shafts 59 shown, is illustrated in one locked position, while the other crank shaft is shown in a second locked position.

Mounted on the cylinders 13 adjacent their upper ends to project outwardly from the various crank shafts 59 below the same, are a plurality of bearing brackets 68 within which a tubular cam shaft 69 is journaled. To drive this cam shaft, a beveled gear 70 is mounted adjacent one end of the main crank shaft 11 of the engine and this beveled gear meshes with a beveled gear 71 mounted on an upright shaft 72 journaled in suitable bearings and running upwardly to a point adjacent the right end of cam shaft 69, as viewed in Fig. 1. The cam shaft 69 is driven from the shaft 72 through the medium of a beveled gear 73 secured to the upper end of shaft 72 and a beveled gear 74 secured to the adjacent end of the cam shaft 69. Disposed within the tubular cam shaft 69 are a pair of slidable cam operating shafts 75 and 76 respectively, both of said shafts being of tubular construction, and the inner shaft 75 which is used for operating the Diesel cams being inwardly nested in the outer shaft 76 which will operate one of the steam cams. The two sliding shafts 75 and 76 project beyond the left end of cam shaft 69 as viewed in Fig. 5 and a ring bearing 77 is secured to this end of the cam shaft 69 to support the sliding shafts at this point. The outer sliding shaft 76 is also centrally spaced from the cam shaft 69 at spaced points by means of diametrically opposed lugs 78 formed integral with or secured to the outer sliding shaft 76. A grooved shipper ring 79 is secured to the sliding shaft 76 outwardly from but adjacent the ring bearing 77 and diametrically opposed longitudinal slots 80 are cut in sliding shaft 76 outwardly from shipper ring 79 to receive a cross pin 81 connected at its ends to a second grooved shipper ring 82 encircling sliding shaft 76 but slidable thereon. This pin 81 also projects through diametrically opposed longitudinal slots 83 cut in the inner sliding shaft 75 and of considerably greater length than the slots 80.

Adjacent the positions that the cam rollers on rocker arms 61 assume over the cam shaft 69, slots 84, 85 and 86 are respectively cut at diametrically opposite points in the respective shafts 69, 76 and 75 to extend longitudinally of the same for reception of cross bars 87 connected at their ends to Diesel intake valve cam rings 88 to which Diesel intake valve cams 89 are secured. The rings 88 encircle the cam shaft 69 but are slidable thereon. Neighboring slots 84 and 86 are of the same length, while the neighboring slots 85 are of considerably greater length than the slots 84 and 86. Each cam 89 is of a peculiar shape, which is best shown in Figs. 1 and 7. The cam has a forward edge which extends practically straight crosswise of the surface of the ring 88 but the rear edge of the cam extends somewhat diagonally transversely of the ring. The cam tapers from a peak or high point adjacent its extreme right hand edge as viewed in Fig. 1, and in Fig. 5, to a low point joining the surface of the ring 88. The slot 84 is of sufficient length to permit sliding movement of the bar 87 and ring 88 to carry the cam 89 from such a position where all portions of the same are out of line with the roller 64 of the rocker arm 61 therefor, to a position where the high point of the cam 89 is directly in line with the roller 64 of rocker arm 61. It should be also here noted that as viewed in Fig. 5, when the right ends of the two sets of slots 80 and 83 are in substantial alinement, and the shipper ring 79 is moved to its extreme position to the right, the left ends of slots 84 and 85 will be alined, while the left ends of the slots 86 will strike the left sides of the bars 87. Cross pins 90 extend diametrically across the inner sliding shaft 75 in spaced relation from the left ends of the slots 86 as viewed in Fig. 5, and coiled pressure springs 91 extend between and react against the pins 90 and the left sides of the cross bars 87. A coiled tension spring 92 is connected at one end to the cross pin 81 and at its other end to the extreme left end cross pin 90, as viewed in Fig. 5. Accordingly spring 92 tends to move the shipper collar 82 to the right while it tends to move the inner sliding shaft 75 to the left as viewed in Fig. 5. The springs 91 tend to retain the cross bars 87 and accordingly the cam rings 89 and cams 89 in extreme right hand positions abutting the right ends of the slots 84 until such time as the right ends of the slots 86 strike the cross bars 87, during sliding movement of the inner sliding shaft 75 to the left.

The lugs 78 carried by outer sliding shafts 76 are located somewhat to the right of the planes of the rollers 64 mounted on the rocker arms 63, when the sliding shafts 76 and 75 are in the positions shown in Fig. 5. Pairs of blocks 93 are mounted for sliding movement on the lugs 78 in diametrically opposed slots 94 cut in the cam shaft 69 below the rollers on the rocker arms 63 and projected to the right of the rocker arms as viewed in Fig. 5. Steam intake valve cam rings 95 encircle the cam shaft 69 and are fixed to the blocks 93. Each of these cam rings 95 carries a steam intake cam 96 thereon and it also carries a cam 97 thereon for operating the rocker arm 63 above the same to supply steam or scavenging air to its valve 43. The cam 96 is a low flat cam as best shown in Figs. 1, 5 and 8 and is of the same height throughout. The forward edge of the cam extends transversely of the ring 95, while the rear edge of the cam inclines from the left edge of the cam rearwardly to the right edge of the same. The cam 97 is formed on a projecting flange of the ring 95 at the left of the cam 96 and the cam 97 projects higher than the cam 96. A grooved flange 98 adapted to receive a spanner wrench is formed on the periphery of ring 95 adjacent its right edge. The ring 95 and blocks 93 to which the ring is secured are adapted to be shifted and locked in two different positions. In one position each ring 95 is adapted to be locked to the cam shaft 69 to bring the cam 97 into alinement with the roller 64 of the adjacent rocker arm 63. In the other position the ring is locked to the lugs 78 of cam shaft 76 to permit the ring to be slid with the shaft 76 to bring the cam 96 more or less into alinement with the roller of the rocker arm 63. In this second position the cam 97 will be disposed to the left of the rocker arm 63 as viewed in Fig. 5. To lock the ring 95 to cam shaft 69 any suitable construction may be provided, such as that shown in the drawings, as best seen in Fig. 8. A T-shaped plunger 99 is slidably mounted within an aperture projecting through the grooved flange portion 98 of ring 95 and also in a longitudinal slot 131 formed in cam shaft 69. The head of the T-shaped plunger may fit at times within notches 100 in the cam shaft 69 adjacent one of the slots 94. A bow spring 101 is secured to the upper and outer end of the T-shaped plunger 99 and the ends of this bow-shaped spring bear against the groove of the flanged groove 98. The spring 101 is, of course, under tension to pull the head of the plunger 99 outwardly to be received within the notches 100. To lock the cam ring 95 to the outer sliding shaft 76, a recess 102 is formed in one of the pair of lugs 78. Within this recess there is mounted a block 103 under spring tension to move outwardly by reason of a small coiled spring 104 fitting within recess 102 and bearing against block 103. Another T-shaped plunger 105 projects through an aperture extending through the grooved flange 98 and one of the blocks 93 and the head of this plunger fits within a recess in the inner portion of the block 93. The block 103 as best shown at the right of Fig. 5 is adapted to also fit within the recess in the block 93 when the block 93 and ring 95 have been slid to proper position relative to the lug 78 within which recess 102 is formed. A bow spring 106 similar to the bow spring 101, is attached to the outer end of plunger 105 and bears at its ends against the groove of flange 98 to urge the plunger 105 outwardly. By application of a spanner wrench to the grooved flange 98 of ring 95 while cam shaft 69 is rotating, it will be seen that both plungers 99 and 105 may be depressed against the tension of their springs 99 and 106 respectively to permit sliding movement of ring 95 and blocks 93 attached thereto relative to both cam shaft 69 and outer sliding shaft 76. In this manner it is possible to slide the ring 95 to the proper position to cause locking engagement of the same either with the cam shaft 69 or with the outer sliding shaft 76.

A block 107 is slidably mounted in a slot 108a cut in cam shaft 69 adjacent the position of the roller 64 of each rocker arm 62. Secured to this block 107 is a steam exhaust cam ring 108 which encircles the came shaft 69. On the periphery of this ring there is formed a steam exhaust cam 109 and a cam 110 for use in operating the rocker arm 62 to supply steam or scavenging air to the steam exhaust valve 53. The steam exhaust cam 109 is comparatively low and has a forward edge and a rear edge, both of which extend transversely of ring 108. Cam 110 is higher than cam 109 but it is of shorter length than the same, cam 110 being disposed to the left of cam 109 as viewed in Fig. 5. There is also formed on ring 108 a grooved flange 111 adapted to receive a spanner wrench. A T-shaped plunger 112 similar in all respects to plunger 99 projects through an aperture in the grooved flange 111 and through an aperture in block 107 and the head of this plunger may fit within a recess formed within block 107. Ring 108 and block 107 may be shifted and locked in two different positions relative to cam shaft 69 and for this purpose the cam shaft is provided with two pair of oppositely disposed notches 113 and 114 respectively, at the sides of each slot 108a. The head of the plunger 112 may fit within either set of these notches and is urged into engagement with these notches by means of a bow spring 115 similar to the springs 99 and 106 and connected to the plunger 112 at its outer end and bearing against the groove of the grooved flange 111. The notches 113 and 114 are spaced longitudinally of cam shaft 69 from each other and when the plunger 112 is disposed within notches 113, cam 110 will be alined with the roller 64 of rocker arm 62; while when plunger 112 is engaged within notches 114, cam 109 will be alined with roller 64 of rocker arm 62. By use of a spanner wrench applied within the grooved flange 111, plunger 112 may be depressed to throw the same out of both sets of notches 113 and 114 whereupon the ring 108 may be slid from one position to its other position.

An oil sump 116 is mounted on the crank case 10 at the opposite end thereof from the flywheel 12 and located within the oil sump is an oil pump 117 having a pump shaft 118 driven from the main crank shaft 11 by means of a beveled gear 119 mounted on the crank shaft and a beveled gear 120 mounted on the pump shaft 118. Connected to the pump shaft 118 and operatively applied for use with the pump 117 and for actuation of a link 121 is a centrifugal hydraulic governor 122 of standard construction and which it will not be necessary to describe in detail. A bell crank shipper lever 123 is pivotally connected to the link 121 and operatively applied for shifting the shipper ring 82. The centrifugal hydraulic governor is so constructed and connected to the shipper lever 123 that as the speed of the crank shaft 11 decreases, the shipper ring 82 will move to the left as viewed in Fig. 1, while as the speed of the engine increases, the shipper ring 82 will move to the right as similarly viewed.

An hydraulic pressure regulator 124, best illustrated in Figs. 10 and 11, and including an hydraulic jack 124a mounted on a bracket 127 carried by the left hand cylinder 13, is provided. This hydraulic pressure regulator is of standard construction and need not be described in detail. It is connected by a conduit 142 to the exhaust steam pipe 133 and it operates a sliding rod 125 connected to the plunger of the jack 124a. As the steam pressure in the steam utilizing device 134 drops below the point for which the regulator 124 is set, which is significant for need of more steam to be supplied from the exhaust steam pipe 133, the steam pressure regulator will operate to move the rod 125 to the right as viewed in Figs. 1, 11 and 12. Similarly, as the steam pressure in the steam utilizing device 134 rises above the point for which the regulator 124 is set, which is significant of the fact that more steam is supplied from the exhaust steam pipe 133 than is needed to operate the steam utilizing device 134, the steam pressure regulator will operate to move the rod 125 to the left, as viewed in Figs. 1, 11 and 12. A shipper lever 126 operably associated with the shipper ring 79 is suitably fulcrumed on bracket 127 and this shipper lever, as best shown in Fig. 12, has a hollow upper end receiving a sliding pin 128. The lever below the pin 128 is provided with an aperture 126a through which the rod 125 extends and this rod is provided with a notch 130 which normally receives the lower end of the pin 128. The pin 128 is normally pressed into the notch 130 by means of a coiled spring 129, surrounding the upper portion of the lever 126, anchored at its upper end to the lever and bearing at its lower end against a cross pin 128a secured to the pin 128 and projecting through oppositely disposed slots in the sides of the lever 126. As the hydraulic pressure regulator 124 calls for more steam and rod 125 is moved to the right, as viewed in Figs. 1, 11 and 12, if the shipper ring 79 is capable of moving to the left, the shipper lever 126 through engagement of the spring pressed pin 128 in the notch 130 will swing on its fulcrum to slide the shipper ring 79 to the left. If movement of the shipper ring 79 to the left is prevented by reason of the position of the shipper ring 82, as the rod 125 moves to the right, the spring pressed pin 128 will rise out of the notch 130 to permit the movement of the rod 125 without swinging the shipper lever 126. As the steam pressure in the steam utilizing device 134 rises above the point for which the regulator 124 is set, and the rod 125 is moved to the left, as viewed in Fig. 1, the shipper lever 126, if the pin 128 is engaged in the notch 130, will move to slide the shipper ring 79 to the right.

The engine, as shown in Fig. 10, will drive some power driven mechanism, such as the generator 143 shown, as by means of a suitable drive, such as the belt 144 running over the fly wheel 12 and a pulley 145 secured to the generator shaft.

Operation

For the purpose of describing Diesel operation of the engine, let us temporarily consider only cylinder A and the parts associated therewith. For operation of cylinder A under Diesel power, the parts associated therewith will be set to take the position shown at the left of Fig. 5. The crank shaft 59 will be locked by the dog 66 in such position that the Diesel intake valve rocker arm 61 is in its lowest relation, while the other two rocker arms 62 and 63 are in their highest relation. The steam intake cam ring 95 will be locked by means of plunger 99 to the cam shaft 69 so that the cam 97 is in line with the roller 64 of steam intake valve rocker arm 63. The steam exhaust cam ring 111 will be locked to the cam shaft 69 by means of engagement of plunger 112 within notches 113 to aline the cam 110 with the cam roller of steam exhaust valve rocker arm 62. Valve 19 in air supply conduit 18 will be opened, valve 24 will be disposed as shown in Fig. 2, to permit the exhaust of exploded gases through the mouth 22 of conduit 21 and exhaust pipe 132, and valve 50 will be set to permit the admission of air from pump 131 and conduit 18a through the mouth 52 to conduit 49, while valves 50 and 139 will be set to permit admission of air from the pump 131 and conduit 18a through mouths 140 and 57 to conduit 54.

The engine may be initially started in the manner of any Diesel engine or as later described. At the time that the engine first starts the centrifugal hydraulic governor 122, if it has not raised link 121 upwardly it will quickly do so to move the bell crank shipper lever 123 and sliding shipper ring 82 to the left, as viewed in Fig. 1. As this occurs, the pin 81 will of course slide to the left in the slots 80 and 83 of sliding shafts 75 and 76, thereby exerting increased tension on the spring 92 which is of quite heavy construction. The tension of spring 92 after the shipper ring 82 has moved a short distance to the left, will cause the inner sliding shaft 75 to also slide to the left whereupon the ends of the slots 86 will strike the cross bar 87 and as continued movement of the shipper ring 82 takes place, the sliding shaft 75 will engage the cross bar 87 to move the bar, Diesel cam ring 88 and Diesel cam 89 therewith. Of course, the pressure spring 92 will retain the cross bar 87 against the ends of the slots 84 to prevent sliding movement of the Diesel cam ring 88 to the left until such time as the ends of the slots 86 strike the cross bar 87. Due to the fact that the slots 86 in shaft 75 are considerably shorter than the slots 80 in outer sliding shaft 76, sliding movement of the outer shaft 76 to the left will not necessarily take place before the Diesel cam ring 88 moves to the left. As the Diesel cam ring 88 moves to the left, the Diesel cam 89 will be brought into line with the cam roller 64 of the Diesel intake valve rocker arm 61, and the farther that cam 89 moves to the left, the higher will be the portion of the cam 89 in line with this cam roller. Of course, the roller 64 of the rocker arm 61 will be struck by the cam 89 as the cam shaft 69 revolves, and the rocker arm will be raised through varying distances dependent on whether a low or a high portion of the cam 89 is alined with the roller of the rocker arm. Also during rotation of the cam shaft 69, the two cams 97 and 110 will strike the rollers 64 of the respective rocker arms 63 and 62 to raise these rocker arms.

As the forked end of the Diesel intake valve rocker arm 61 overlying the nut 29 on the shank of plunger 28 is depressed through raising movement of the roller equipped end of the said rocker arm, the plunger 28 will be depressed in the pump chamber 27 against the tension of spring 32. Downward movement of the plunger 28 in pump chamber 27 will move valve 34 downwardly from its seat 26 against the tension of spring 35 to discharge whatever fuel there may be in pump chamber 27 into the expansion space 16 of the cylinder 13. Back movement of fuel from the pump chamber 27 through the liquid fuel conduit 36 is of course prevented by reason of the check valve 39. The area of the upper surface of the flange 31 connected to the shank of the plunger 28 is the same as the area of the head of the valve 34, so as to permit discharge of fuel into the expansion space 16 irrespective of the pressure of gases within this expansion space. After the roller 64 of rocker arm 63 rides over the cam 89, spring 32 will of course raise the plunger 28 to draw into the pump chamber 27 another charge of fuel from the supply conduit 36.

As the cam roller equipped ends of the two rocker arms 62 and 63 rise, these rocker arms will depress the respective valves 43 and 53 and air under pressure will be supplied by way of the mouths 52 and 57 respectively through the valve cages for the said respective valves into the expansion space 16 to cool the said valves, and supply scavenging air to expansion space 16.

As an explosion takes place within the cylinder 13, the piston 14 will of course be driven downwardly from its upper position until such time as it reaches its lowermost position whereupon the two ports 17 and 20 will be in communication with the expansion space 16. Air under pressure supplied through the conduit 18 will then issue from the port 17 to the expansion space 16 to scavenge the same by forcing the spent gases through the exhaust port 20 and at the same time to supply fresh air to the expansion space 16 for the next charge. As the piston 14 raises from its lowermost position, it will first close off communication between the ports 17 and 20 and the expansion space 16 and it will then compress the gases in the expansion space until at the end of the upward stroke the gases are compressed to such a point that they will ignite a charge of fuel admitted to the expansion space by reason of the actuation of the fuel admission valve 34. Operation of this valve is timed to take place at approximately the same time that the piston 14 reaches its highest point and ignition will then take place to again drive the piston downwardly. The two cams 97 and 110 are positioned to so time the operation of the two valves 43 and 53 respectively, that these valves will open at the time that the piston 14 is in its lowest position and the air admitted to the expansion space 16 through operation of these said valves will assist in scavenging the burnt gases from the expansion space 16, as well as to cool the valves 43 and 53. It is contemplated to supply steam to the expansion space 16 during Diesel operation by operation of the valves 43 and 53 through the medium of the cams 97 and 110.

Although the operation of only a single cylinder under Diesel power has been described, it will of course be understood that all or any number of cylinders may at any time be operated under Diesel power by proper setting of the parts associated therewith.

For the purpose of describing steam operation of the engine, let us temporarily consider only cylinder B and the parts associated therewith. For operation of cylinder B under steam power the parts associated therewith will be set to take the position shown at the right of Fig. 5. The crank shaft 59 will be locked by the dog 66 in such position that the Diesel intake valve rocker arm 61 is in its highest relation in such position that the cam roller 64 thereof cannot be struck by the Diesel cam 89. The other two rocker arms 62 and 63 will then of course be set in their lowest relation. The steam intake cam ring 95 will be locked by means of block 103 to the outer sliding shaft 76 in such position that the cam 97 is disposed to the left of the cam roller for steam intake valve rocker arm 63 and the steam intake cam 96 is disposed so that it may be brought more or less into line with the said cam roller by sliding movement of the ring 95 and outer sliding shaft 76 to the left. The steam exhaust cam ring 109 will be locked to the cam shaft 69 in its extreme left hand position as viewed in Fig. 5 by engagement of the plunger 112 in the notches 114. Valve 19 in air supply conduit 18 will be closed, valve 24 will be swung through 90° from its position shown in Fig. 2 to permit the travel of gases from the expansion chamber 16 through the outlet 23 and exhaust steam pipe 133 to the steam utilizing device 134. Valve 50 will be disposed as shown in Fig. 2, to permit travel of steam under pressure through the conduit 51 to the passage 48, while valve 55 will be set to permit the travel of steam through the conduit 54 outwardly through the outlet 56 to exhaust steam pipe 133. Shipper lever 126 will be so disposed that the pin 128 fits within notch 130.

If the pressure of steam in the steam utilizing device 134 and in the exhaust steam pipe 133 falls below the pressure for which the hydraulic pressure regulator 124 is set, i. e. if there is a call for steam for process use or for heating or the like, the hydraulic pressure regulator 124 will cause the rod 125 to move toward the right as viewed in Fig. 1, thereby causing the shipper lever 126 to shift the shipper ring 79 to the left as viewed in Figs. 1 and 5, (assuming shipper ring 82 to be moved to the left to position the cross pin 81 adjacent the left ends of the slots 80. As the shipper ring 79 moves to the left, the outer sliding shaft 76 will of course be moved therewith to slide the steam intake cam ring 95 toward the left or to such a point that the steam intake cam 96 is alined with the cam roller 64 on the steam intake valve rocker arm 63. Movement of the outer sliding shaft 76 in this direction is permitted irrespective of the positioning of the bar 87 by reason of the provision of the slots 85 in the outer sliding shaft 76. As the ring 93 is not locked in engagement with the cam shaft 69 at this time, the cam shaft does not interfere with this movement. As the cam shaft 69 rotates, the steam intake cam 96 will of course engage the cam roller 64 of the steam intake valve rocker arm 63 and it will raise the roller end of this rocker arm. The roller end of the said rocker arm will be raised for different periods of time dependent on the distance that the ring 95 is slid to the left as viewed in Fig. 5. In other words the roller end of the rocker arm 63 will be held raised during different periods of time because of the peculiar shape of the cam 96 and because this cam is controlled in its sliding movement to the left and right by the hydraulic pressure regulator 124, which is responsive to the needs for steam by the steam utilizing device 134. The shipper ring 82 acts as a master control regulating the sliding movement of the sliding shaft 76. The position of the shipper ring 82 is of course controlled through the medium of the centrifugal hydraulic governor 122 by the power requirements of the engine. If power requirements of the engine to drive the power driven mechanism 143 at constant speed are not such as to cause the ring 82 to be moved sufficiently to the left as viewed in Fig. 5, to in turn allow the shipper ring 79 to move sufficiently to the left in order that sufficient steam may be supplied for meeting the demands of the steam utilizing device 134 as determined by the hydraulic pressure regulator 124, then the rod 125 will move to the right as viewed in Fig. 1, while movement of the lower end of the shipper lever 126 to the left will be stopped by reason of the fact that the shipper ring 79 moving to the left will strike the shipper ring 82. The spring pressed pin 128 will then kick upwardly out of its notch 130 in rod 125 to permit sliding movement of the rod 125 to the right without carrying the shipper lever 126 therewith. When this occurs, it will be significant of the fact that more steam must be supplied than can be obtained through operation of the cylinder B under steam for process work or for heating.

The steam exhaust cam 109 being in line with the cam roller 64 of the steam exhaust valve rocker arm 62 will of course strike this roller to raise the roller end of rocker arm 62 as the cam shaft 69 rotates.

At the time that the piston 14 of cylinder B under steam operation is at the upper end of its stroke, the steam intake valve rocker arm 63 will depress the steam intake valve 43 to inject steam under high pressure into the expansion space 16. This steam being supplied through the mouth 51 to conduit 49, passage 48 and valve cage 41. The flange 46 has the same area as the head of the valve 43 so that pressure at both ends of the valve 43 will be the same to permit proper injection of steam into the expansion space 16. The steam admitted to the expansion space 16 will of course drive the piston downwardly to its lowermost position whereupon uniflow exhaust of steam will take place through the exhaust port 20 as this port is uncovered by depression of the piston 14. The exhaust steam will then travel through the conduit 21 and outlet 23 to the exhaust steam pipe 133, whereupon it may be distributed to the steam utilizing device 134 for utilization. At the same time that the port 20 is uncovered by depression of the piston 17, the exhaust valve rocker arm 62 will open the exhaust valve 53 to permit contra-flow exhaust of steam from the expansion space 16 through the conduit 54 and outlet 56 thereof. This exhaust steam will also run to the exhaust steam pipe 133 and steam utilizing device 134.

It will be seen that Diesel operation of cylinder A will not interfere with steam operation of cylinder B. It will also be appreciated that either cylinder or any cylinder of the engine may be quickly changed over for operation either under steam power or Diesel power. It will then at once be perceived that all cylinders may be operated under Diesel power, all cylinders may be operated under steam power or any number of cylinders may be operated under Diesel power while the remaining cylinders are operated under steam power. If certain cylinders are operated under Diesel power, and other cylinders are operating under steam power, and the pin 128 carried by shipper lever 127 kicks out from the notch 130, this will be significant of the fact, as has been before pointed out, that there is not sufficient exhaust steam being supplied for proper operation of steam utilizing device 134. In other words there will not be enough cylinders under steam operation to supply the demands for steam for process work or for heating. One or more cylinders can then quickly and readily be changed over from Diesel operation to steam operation without stopping the engine. The proper valves may be turned and by use of a spanner wrench in the grooved flanges 98 and 111 of the proper rings 95 and 108, proper positioning of the steam cams of the cylinders to be changed over can be readily made. Also the dogs 66 may be released and the crank shafts 59 properly located for operation of additional cylinders under steam. Similarly if when certain cylinders are under steam operation, it is found that the shipper ring 79 moves to its extreme position to the right as viewed in Fig. 5, while shipper ring 82 moves to its left hand position it will be known that more exhaust steam is being supplied by the cylinders under steam operation than can be utilized for process work or for heating and for most efficient operation of the engine, one or more of the cylinders should be changed over from steam operation to Diesel operation. This, of course, can be readily done while the engine is running as above explained. It will be seen that by properly maintaining the correct number of cylinders under steam operation and Diesel operation, the engine can be run most efficiently and economically to produce the requisite amount of power and at the same time to produce the necessary quantity of steam for process work, heating and the like. Peak loads for power and for steam for process use and for heating can be readily taken care of without difficulty with great economy. The flexibility of the engine for use under widely differing conditions will be readily appreciated.

In starting the engine for use under Diesel operation, one or more cylinders may be first operated by steam and then converted to Diesel operation and the equipment usually necessary for starting a Diesel engine may thus be eliminated, if desired.

Although the present engine is illustrated for operation of the various cylinders in the same manner as two cycle Diesel engines, it will be clearly understood that changes may be made to permit operation of the various cylinders in the same manner as four cycle Diesel engines, or as two or four cycle internal combustion engines of any type. The mechanism for changing over the different cylinders from one operation to the other operation and the means for regulating the feed of fuel and steam to the different cylinders are of course capable of being greatly changed, without departing from the scope of the invention.

It will, of course, be understood that many other changes may be made in the form, details, arrangement and proportions of the various parts without departing from the scope of the present invention.

What is claimed is:—

1. The combination with power driven mechanism and steam utilizing means, of a convertible engine driving said power driven mechanism and supplying exhaust steam to said steam utilizing means, said engine including means for operating it under internal combustion power, means for operating it under steam power and change over mechanism for converting said engine from operation under one source of power to operation under the other, pressure regulator control mechanism responsive to the requirements of said steam utilizing means and controlling the supply of steam to said engine and speed governing mechanism maintaining the speed of the engine substantially constant to meet fluctuating requirements of said power driven mechanism, said speed governing mechanism controlling the supply of combustible fluid to said engine and including means restraining said pressure regulator control mechanism from supplying more steam to said engine than necessary to maintain the speed of the engine proper for meeting the fluctuating requirements of said power driven mechanism.

2. The combination with power driven mechanism and steam utilizing means, of a convertible multi-cylinder engine driving said power driven mechanism and supplying exhaust steam to said steam utilizing means, said engine including means for operating any number of its cylinders under internal combustion power, means for operating any number of its cylinders under steam power and individual change over mechanism for each cylinder for converting the same from operation under one source of power to operation under the other, pressure regulator control mechanism responsive to the requirements of said steam utilizing means and controlling the supply of steam to the cylinders under steam operation, and speed governing mechanism maintaining the speed of the engine substantially constant to meet fluctuating requirements of said power driven mechanism, said speed governing mechanism controlling the supply of combustion fluid to the cylinders under internal combustion power operation and including means restraining said pressure regulator control mechanism from supplying more steam to the cylinders under steam operation than necessary to maintain the speed of the engine proper for meeting the fluctuating requirements of said power driven mechanism.

3. A reciprocating engine comprising a plurality of cylinders each forming an expansion space, pistons working within the respective cylinders, exhaust ports affording communication with respective expansion spaces at certain times, steam admission valves for the respective cylinders affording communication with the respective expansion spaces thereof, controlled means for supplying steam under pressure to said steam admission valves, liquid fluid injection valves for the respective cylinders affording communication with the respective expansion spaces, controlled means for supplying explosive fluids to said fluid injection valves, rocker arms mounted for operation of the respective steam admission and fluid injection valves, a cam shaft, steam admission valve cams slidably mounted on said cam shaft, fluid injection valve cams slidably mounted on said cam shaft, means for individually locating the rocker arms for each cylinder relative to the various cams for the same cylinder to permit operation of only the steam admission valve of the cylinder from the steam admission cam while preventing operation of the fluid injection valve by the fluid injection valve cam and vice versa, whereby any number of cylinders may be placed under operation by steam power and any number of cylinders may be placed under operation by internal combustion power, a centrifugal hydraulic governor controlling the position of the fluid injection cams, and including means acting as a master control for the steam admission valve cams, and a hydraulic pressure regulator controlling the positioning of the steam admission valve cams subject to the action of the centrifugal hydraulic governor.

4. A reciprocating engine comprising a cylinder forming an expansion space, a piston working within the cylinder, an exhaust port communicating with said expansion space at certain times, a steam admission valve affording communication with said expansion space, controlled means for supplying steam under pressure to said admission valve, an explosive fluid injection valve affording communication with said expansion space, controlled means for supplying explosive fluids to said fluid injection valve, a steam admission valve rocker arm, a fluid injection valve rocker arm, a tubular cam shaft, first and second sliding shafts disposed within said cam shaft, a steam admission valve cam mounted for sliding movement on said cam shaft, means for locking the steam admission valve cam in one position to said cam shaft out of line with said steam admission valve rocker arm and in another position to one of said sliding shafts in position to move into line with said steam admission valve rocker arm as the first mentioned sliding shaft is slid in one direction, a fluid injection valve cam mounted on the second mentioned sliding shaft for sliding movement therewith into alinement with the fluid injection valve rocker arm, means for shifting the position of the fluid injection valve rocker arm from the position where the fluid injection valve cam may strike the same during its sliding movement to a position where it can not strike the same, means for shifting said first mentioned sliding shaft and means for shifting said second mentioned sliding shaft whereby the cylinder may be placed under steam operation or the cylinder may be placed under internal combustion operation.

5. A reciprocating engine comprising a plurality of cylinders each forming an expansion space, pistons working within the respective cylinders, an exhaust port for each cylinder communicating with the expansion space thereof at certain times, a steam admission valve for each cylinder affording communication with the expansion space thereof, controlled means for supplying steam under pressure to said steam admission valves, an explosive fluid injection valve for each cylinder affording communication with the expansion space thereof, controlled means for supplying explosive fluids to said fluid injection valves, a steam admission valve rocker arm for each cylinder, a fluid injection valve rocker arm for each cylinder, a tubular cam shaft, first and second sliding shafts disposed within said cam shaft, a steam admission valve cam for each cylinder mounted for sliding movement on said cam shaft, means for locking each steam admission valve cam in one position to said cam shaft out of line with a steam admission valve rocker arm adjacent thereto and in another position to one of said sliding shafts in position to move into line with its steam admission valve rocker arm as the first mentioned sliding shaft is slid in one direction, a fluid injection valve cam for each cylinder mounted on the second mentioned sliding shaft for sliding movement therewith into alinement with the fluid injection valve rocker arm of the particular cylinder, means for shifting the position of the fluid injection valve rocker arm of each cylinder from the position where the fluid injection valve cam of the particular cylinder may strike the same during its sliding movement to a position where it cannot strike the same, means for shifting said first mentioned sliding shaft and means for shifting said second mentioned sliding shaft whereby any number of cylinders may be placed under steam operation and any number of cylinders may be placed under internal combustion operation.

6. A reciprocating engine comprising a cylinder forming an expansion space, a piston working within the cylinder, an exhaust port communicating with said expansion space at certain times, a steam admission valve affording communication with said expansion space at certain times, means for supplying steam under pressure to said admission valve, an explosive fluid injection valve affording communication with said expansion space at certain times, means for supplying explosive fluids to said fluid injection valve, a steam admission valve rocker arm, a fluid injection valve rocker arm, a tubular cam shaft, first and second sliding shafts disposed within said cam shaft, a steam admission valve cam mounted for sliding movement on said cam shaft, means for locking said steam admission valve cam out of line with said steam admission valve rocker arm, means for locking said steam admission valve cam to one of said sliding shafts in a position to move into line with said steam admission valve rocker arm as the first mentioned sliding shaft is slid in one direction, a fluid injection valve cam mounted on the second mentioned sliding shaft for sliding movement therewith into alinement with the fluid injection valve rocker arm, means for shifting the position of the fluid injection valve rocker arm from the position where the fluid injection valve cam may strike the same during its sliding movement to a position where it can not strike the same, automatically controlled means for shifting said first mentioned sliding shaft and automatically controlled means for shifting said second mentioned sliding shaft whereby the cylinder may be placed under automatically controlled steam operation or the cylinder may be placed under automatically controlled internal combustion operation.

7. A reciprocating engine comprising a plurality of cylinders each forming an expansion space, pistons working within the respective cylinders, an exhaust port for each cylinder communicating with the expansion space thereof at certain times, a steam admission valve for each cylinder affording communication with the expansion space thereof at certain times, means for supplying steam under pressure to said expansion spaces, an explosive fluid injection valve for each cylinder affording communication with the expansion space thereof at certain times, means for supplying explosive fluids to said fluid injection valves, a steam admission valve rocker arm for each cylinder, a fluid injection valve rocker arm for each cylinder, a tubular cam shaft, first and second sliding shafts disposed within said cam shaft, a steam admission valve cam for each cylinder mounted for sliding movement on said cam shaft, means for locking each steam admission valve cam out of line with a steam admission valve rocker arm adjacent thereto, means for locking each steam admission valve cam to one of said sliding shafts in a position to move into line with its steam admission valve rocker arm as the first mentioned sliding shaft is slid in one direction, a fluid injection valve cam for each cylinder mounted on the second mentioned sliding shaft for sliding movement therewith into alinement with the fluid injection valve rocker arm of the particular cylinder, means for shifting the position of the fluid injection valve rocker arm of each cylinder from the position where the fluid injection valve cam of the particular cylinder may strike the same during its sliding movement to a position where it cannot strike the same, automatically controlled means for shifting said first mentioned sliding shaft and automatically controlled means for shifting said second mentioned sliding shaft whereby any number of cylinders may be placed under automatically controlled steam operation and any number of cylinders may be placed under automatically controlled internal combustion operation.

JOHN H. JOHNSON.